US012367356B2

(12) United States Patent
d'Armancourt (10) Patent No.: US 12,367,356 B2
(45) Date of Patent: Jul. 22, 2025

(54) MULTI-ANTENNA RFID PRINTER

(71) Applicant: Hand Held Products, Inc., Charlotte, NC (US)

(72) Inventor: Sébastien Michel Marie Joseph d'Armancourt, Singapore (SG)

(73) Assignee: Hand Held Products, Inc., Charlotte, NC (US)

( * ) Notice: Subject to any disclaimer, the term of this patent is extended or adjusted under 35 U.S.C. 154(b) by 0 days.

(21) Appl. No.: 18/333,012

(22) Filed: Jun. 12, 2023

(65) Prior Publication Data

US 2024/0412012 A1 Dec. 12, 2024

(51) Int. Cl.
*G06K 7/10* (2006.01)
*G06K 17/00* (2006.01)

(52) U.S. Cl.
CPC ..... *G06K 7/10356* (2013.01); *G06K 7/10128* (2013.01); *G06K 7/10326* (2013.01); *G06K 7/10455* (2013.01); *G06K 17/0025* (2013.01)

(58) Field of Classification Search
CPC ........... G06K 7/10356; G06K 7/10326; G06K 7/10455; G06K 17/0025
USPC ........................................................ 235/440
See application file for complete search history.

(56) References Cited

U.S. PATENT DOCUMENTS

| 10,255,535 | B1 * | 4/2019 | Takada ............... G06K 17/0025 |
| 10,592,794 | B2 | 3/2020 | Duckett et al. |
| 10,599,887 | B2 | 3/2020 | Duckett et al. |
| 2005/0058483 | A1 | 3/2005 | Chapman et al. |
| 2007/0013520 | A1 | 1/2007 | Conwell et al. |
| 2008/0297318 | A1 * | 12/2008 | Ohashi ............. G06K 19/07718 340/10.1 |
| 2009/0009578 | A1 | 1/2009 | Nakanishi et al. |

(Continued)

FOREIGN PATENT DOCUMENTS

| EP | 2107510 A1 | 10/2009 |
| JP | 2007-047955 A | 2/2007 |

(Continued)

OTHER PUBLICATIONS

Extended European Search Report Mailed on Sep. 2, 2024 for EP Application No. 24167435, 8 page(s).

(Continued)

*Primary Examiner* — Paultep Savusdiphol
(74) *Attorney, Agent, or Firm* — Alston & Bird LLP (57) ABSTRACT

A radio frequency identification (RFID) printer device for electronically encoding and verifying RFID labels, the RFID printer device comprising a thermal printhead, a platen roller, a first RFID antenna configured upstream from the thermal printhead and the platen roller, a second RFID antenna configured downstream from the first RFID antenna, a memory device having executable instructions stored therein, and one or more processors communicatively coupled to the memory, the one or more processors, in response to the executable instructions, configured to transmit data via the first RFID antenna, wherein the data is encoded to one or more RFID tags associated with respective one or more RFID labels during a first RFID communication window, and receive and transmit data via the second RFID antenna to verify the encoded data during a second RFID communication window.

20 Claims, 7 Drawing Sheets

(56) References Cited

U.S. PATENT DOCUMENTS

| | | | | |
|---|---|---|---|---|
| 2009/0072974 | A1* | 3/2009 | Miyashita | G06K 19/07718 340/572.1 |
| 2016/0189018 | A1* | 6/2016 | Duckett | G06K 1/20 340/10.51 |
| 2020/0406573 | A1* | 12/2020 | Huhtasalo | B31D 1/021 |

FOREIGN PATENT DOCUMENTS

| | | | |
|---|---|---|---|
| JP | 3953389 | B2 | 8/2007 |
| KR | 10-0714804 | B1 | 5/2007 |

OTHER PUBLICATIONS

CN Office Action Mailed on May 14, 2024 for CN Application No. 202410437599, 1 page(s).

English Translation of CN Office Action dated May 14, 2024 for CN Application No. 202410437599, 1 page(s).

* cited by examiner

MULTI-ANTENNA RFID PRINTER

FIELD OF THE INVENTION

Example embodiments of the present disclosure relate generally to printing and encoding radio frequency identification (RFID) tags, and in particular, to a printer device for optimizing RFID label printing speed during RFID encoding and verification operations.

BACKGROUND

Radio frequency identification (RFID) tags may be used in a variety of applications, such as asset tracking, inventory management, toll collection, cargo and supply chain logistics, vehicle tracking, loss prevention, and access control operations, to name a few. RFID tags may be embedded within RFID labels that can be encoded and printed using RFID printers.

Applicant has identified technical challenges and difficulties associated with conventional RFID printing and encoding by a RFID printer.

BRIEF SUMMARY

Various embodiments described herein relate to components, apparatuses, and systems for electronically encoding and verifying radio frequency identification (RFID) labels.

In accordance with various embodiments of the present disclosure, a RFID printer device is provided. In some embodiments, the RFID printer device comprises a thermal printhead, a platen roller, a first RFID antenna configured upstream from the thermal printhead and the platen roller, a second RFID antenna configured downstream from the first RFID antenna, a memory device having executable instructions stored therein, and one or more processors communicatively coupled to the memory. In some embodiments, the one or more processors, in response to the executable instructions, are configured to transmit data via the first RFID antenna, wherein the data is encoded to one or more RFID tags associated with respective one or more RFID labels during a first RFID communication window, and receive and transmit data via the second RFID antenna to verify the encoded data during a second RFID communication window.

In some embodiments, the first RFID antenna is configured with RFID encode only functionality in two antenna operation during the first RFID communication window. In some embodiments, the first RFID antenna comprises a first communication range used to establish the first RFID communication window. In some embodiments, a duration of the first RFID communication window is based on the first communication range. In some embodiments, RFID encode speed using the first RFID antenna is based on the duration of the first RFID communication window. In some embodiments, the second RFID antenna comprises a second communication range used to establish the second RFID communication window. In some embodiments, a duration of the second RFID communication window is based on the second communication range. In some embodiments, RFID verify speed using the second RFID antenna is based on the duration of the second RFID communication window. In some embodiments, the one or more processors are further configured to determine to use two RFID antennas based on a lessening of print speed reductions by separately performing RFID encoding and RFID verifying. In some embodiments, the one or more processors are further configured to determine to use two RFID antennas based on one or more operating parameters. In some embodiments, the one or more operating parameters comprises one or more of RFID encoding time, RFID reading time, maximum print speed, RFID communication window size, RFID communication window margin, or ramp up/down.

In accordance with various embodiments of the present disclosure, a method is provided. In some embodiments, the method comprises receiving, by one or more processors of a RFID printer, a print request, determining, by the one or more processors, one or more operating parameters based on the print request, determining, by the one or more processors, two RFID antennas are used to perform RFID encoding and verifying based on the one or more operating parameters, instructing, by the one or more processors, the RFID printer to perform RFID encoding using a first RFID antenna and to print at a RFID encode speed during a first communication window, and instructing, by the one or more processors, the RFID printer to perform RFID verifying using a second RFID antenna and to print at a RFID verify speed during a second RFID communication window.

In some embodiments, the method further comprises instructing, by the one or more processors, the RFID printer to print at a maximum speed prior to the first RFID communication window. In some embodiments, the method further comprises instructing, by the one or more processors, the RFID printer to print at a maximum speed after finishing the RFID encoding and prior to the second RFID communication window. In some embodiments, the method further comprises instructing, by the one or more processors, the RFID printer to print at a maximum speed to completion of a RFID label after finishing the RFID verifying. In some embodiments, the method further comprises decreasing a print speed of the RFID printer from a maximum print speed to the RFID encode speed during the first communication window. In some embodiments, the method further comprises transmitting data via the first RFID antenna to perform the RFID encoding during the first RFID communication window. In some embodiments, the method further comprises decreasing a print speed of the RFID printer from a maximum print speed to the RFID verify speed during the second communication window. In some embodiments, the method further comprises receiving and transmitting data via the second RFID antenna to perform the RFID verifying during the second RFID communication window.

In accordance with various embodiments of the present disclosure, one or more non-transitory computer-readable storage media including instructions that, when executed by one or more processors, cause the one or more processors to: receive a print request, determine one or more operating parameters based on the print request, determine two radio frequency identification (RFID) antennas are used to perform RFID encoding and verifying based on the one or more operating parameters, instruct a RFID printer to perform RFID encoding using a first RFID antenna and to print at a RFID encode speed during a first communication window, and instruct the RFID printer to perform RFID verifying using a second RFID antenna and to print at a RFID verify speed during a second RFID communication window.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which.

DETAILED DESCRIPTION

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

As used herein, terms such as "front," "rear," "top," etc., are used for explanatory purposes in the examples provided below to describe the relative position of certain components or portions of components. Furthermore, as would be evident to one of ordinary skill in the art in light of the present disclosure, the terms "substantially" and "approximately" indicate that the referenced element or associated description is accurate to within applicable engineering tolerances.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments, or it may be excluded.

Various example embodiments of the present disclosure overcome technical challenges and difficulties in current radio frequency identification (RFID) printers, and provide various technical advancements and improvements. A RFID label may comprise a portion of print media including a corresponding RFID tag embedded therewith that may be encoded while the RFID label is printed, e.g., by a RFID printer. A RFID label may be printed, encoded, and verified simultaneously by a RFID printer. However, such simultaneous operations may reduce printing speed of a RFID printer. For example, printing a RFID label during data encoding to a RFID tag of the RFID label may be slower than printing at maximum print speed when encoding is not performed. As such, overall print speed is reduced to accommodate encoding of a RFID tag. Moreover, tag verification after encoding, may further reduce print speed in order to accommodate verification time.

In accordance with various examples of the present disclosure, methods and systems for improving RFID printing speed are disclosed. Various embodiments of the present disclosure comprise a RFID printer device comprising a pair of RFID antennas, where a first RFID antenna may be dedicated to RFID encoding functionality and a second RFID antenna may be dedicated to RFID verifying functionality. RFID encoding functionality may comprise writing data to a RFID tag. RFID verifying functionality may comprise reading data from the RFID tag, comparing the read data with data that was written to the RFID tag to determine whether the read data is the same as the written data, and if the read data is not the same as the written data, re-writing data to the RFID. By splitting the process of RFID encoding and RFID verifying so that one RFID antenna is used to perform encoding and the other RFID antenna is used to perform verifying, each encoding and verifying task may be completed with faster printing speeds, which in turn may maximize overall printing throughput. Accordingly, RFID printing and encoding may be performed at a speed higher than traditional implementation.

Figure 1:
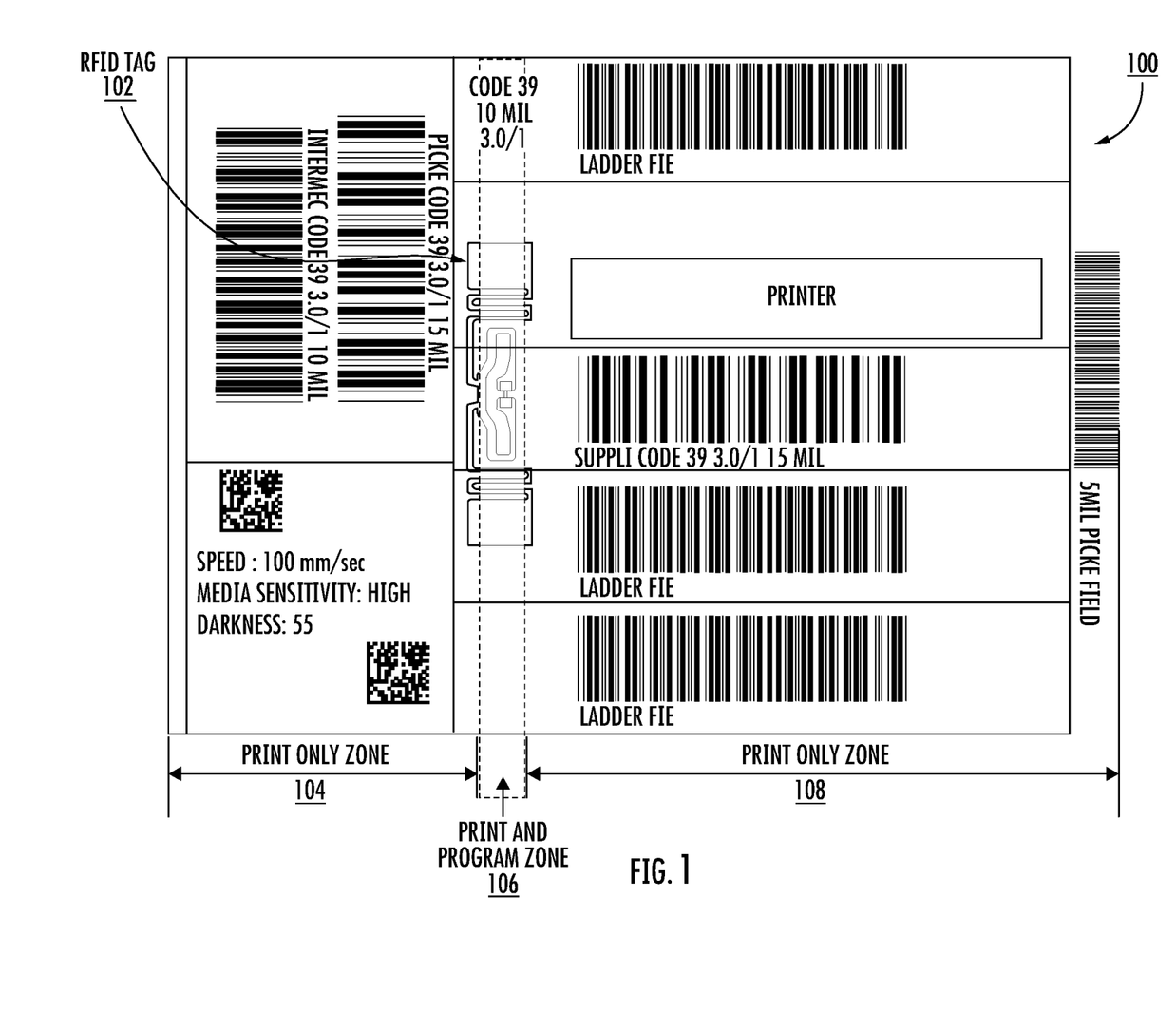
FIG. 1 illustrates an example radio frequency identification (RFID) label used in accordance with various embodiments of the present disclosure.

Referring now to FIG. 1, an example RFID label is depicted, which may be used in accordance with various embodiments of the present disclosure. RFID label 100 comprises a print and program zone 106 disposed between print only zone 104 and print only zone 108. The print and program zone 106 may comprise a section of the RFID label 100 that can be printed on by a RFID printer as well as contain a RFID tag 102. Print only zone 104 and print only zone 108 comprise sections of the RFID label 100 that can be printed on by a RFID printer but do not contain any RFID tags. That is, each individual RFID label, such as RFID label 100, is associated with a single RFID tag. RFID tag 102 may comprise an electronic inlay embedded within the print and program zone 106. Print and program zone 106 may be identified by a RFID printer to determine when it may start encoding and verifying the RFID tag 102, for example, during a RFID communication window.

Figure 2:
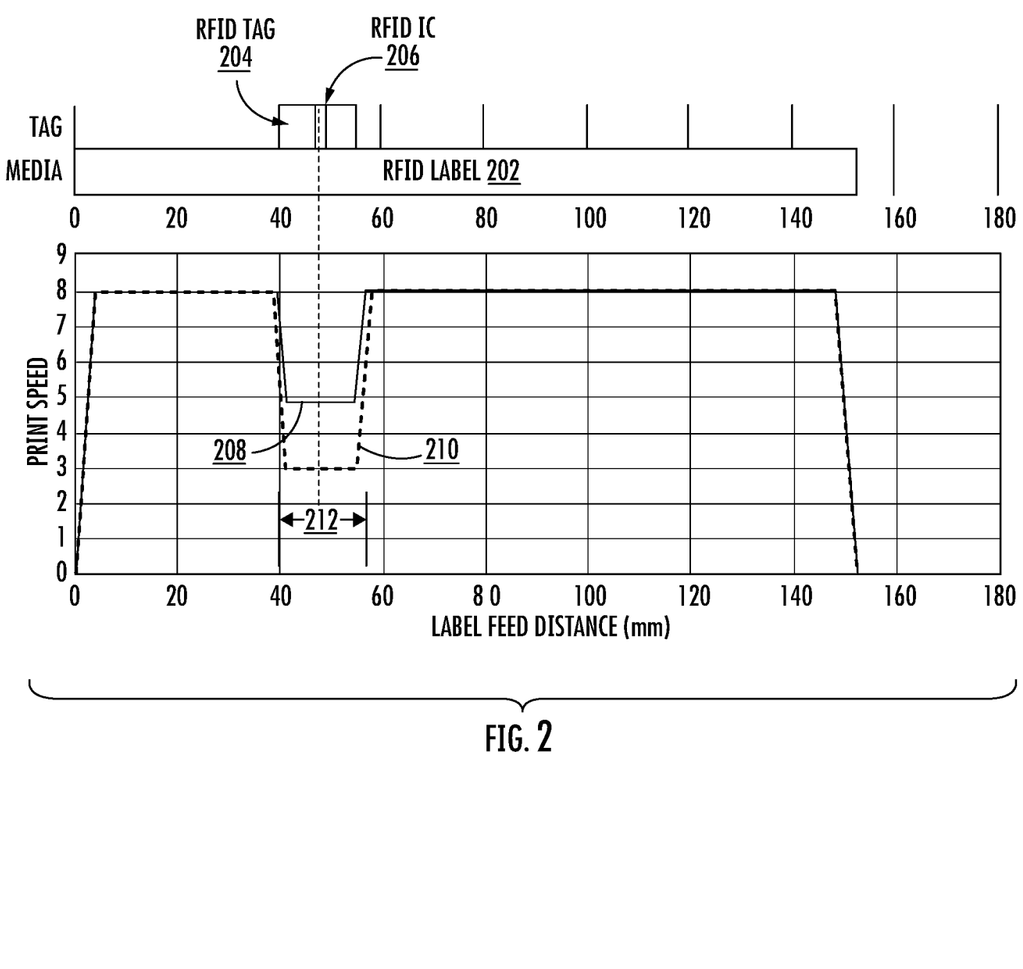
FIG. 2 illustrates example print speeds of a RFID printer printing a RFID label.

Referring to FIG. 2, a physical representation of an example RFID label is depicted in conjunction with an example print speed chart of the RFID label. The print speed chart depicted in FIG. 2 may depict print speeds of a RFID printer while printing an entire length of a RFID label 202. The print speeds depicted in FIG. 2 may be associated with a RFID printer using a single RFID antenna to perform encoding and verifying processes in a single RFID communication window during RFID label printing. As depicted in FIG. 2, the RFID printer may print at various speeds during which RFID label 202 is drawn through various components of the RFID printer for printing, encoding, and verifying.

FIG. 2 depicts the RFID printer printing at maximum print speed set by the RFID printer (e.g., 8 inches per second (ips)) during printing to a first print only zone (e.g., print only zone 104) of RFID label 202, from approximately 0 to 40 mm for both RFID encode only printing 208 and RFID encode and verify printing 210. A RFID communication window 212 may be established between a RFID antenna and RFID integrated chip (IC) 206 when the RFID antenna is in range of the RFID tag 204 within a print and program zone (e.g., print and program zone 106), from approximately 41 mm to 55 mm. Encoding may be performed during the RFID communication window 212 by transmitting data from the RFID antenna to the RFID IC 206.

A duration of time needed for encoding a RFID tag may be more than an amount of time needed to print on RFID label 202. As such, during the RFID communication window 212, the print speed of the RFID printer may be decreased below a maximum print speed to allow for RFID tag encoding in RFID encode only printing 208 or RFID encode and verify printing 210. During the RFID communication window 212 for RFID encode only printing 208, the RFID printer may print at a print speed that allows sufficient time for RFID encoding where data may be transmitted from the RFID antenna to RFID IC 206. Whereas, during the RFID communication window 212 for RFID encode and verify printing 210, the RFID printer may print at a print speed that allows sufficient time for performing both RFID encoding and verifying (e.g., where data may be read from the RFID IC 206 and re-written to the RFID IC 206 via the RFI antenna if the read data does not match the encoding data). To ensure that an entirety of the encode and verify can be completed within the RFID communication window 212 distance (e.g., from approximately 41 mm to 55 mm), the print speed may need to decrease even further than the RFID encode only printing 208.

In both RFID encode only printing 208 and RFID encode and verify printing 210, a single antenna pass in the RFID communication window 212 is used to perform RFID encoding or RFID encoding and verifying. Hence, relying on a single RFID antenna to perform multiple operations (encode and verify) creates a bottleneck at the RFID communication window 212 that requires a significant reduction in print speed. At the end of the RFID communication window 212 and end of encoding data to the RFID IC 206 (e.g., approximately 56 mm), the print speed of the RFID printer increases back to the maximum print speed to finish printing to a second print only zone (e.g., print only zone 108) of RFID label 202 until the end of the label.

Various embodiments of the present disclosure provide methods and systems for optimizing print speed of RFID printers by splitting RFID encoding and RFID verifying per RFID antenna and separate RFID communication windows. As such, both RFID encode and RFID verify operations are not constrained to a single antenna pass comprising a fixed RFID communication window. In some embodiments, a RFID printer may comprise a pair of RFID antennas where one RFID antenna is configured to perform RFID encoding and the other RFID antenna is configured to perform RFID verifying. A first RFID antenna may be configured in a first position within the RFID printer to perform encoding of RFID tags and a second RFID antenna may be configured in a second position within the RFID printer to perform verification of the encoded RFID tags. In particular, specific placement of the RFID antennas may allow for RFID verifying to be performed downstream of RFID encoding, thereby allowing for two antenna passes. With two antenna passes, an additional RFID communication window may be provided to perform RFID decoding separately from RFID decoding, and thus, allowing for faster printing speeds. In some embodiments, the total time taken to perform both RFID encode and RFID verify per label may be reduced and may be substantially similar to time taken to perform RFID encoding only. In some alternative embodiments, it may also be possible to encode a next RFID label while a current RFID label is being verified as the two RFID antennas can be activated at the same time.

Figure 3:
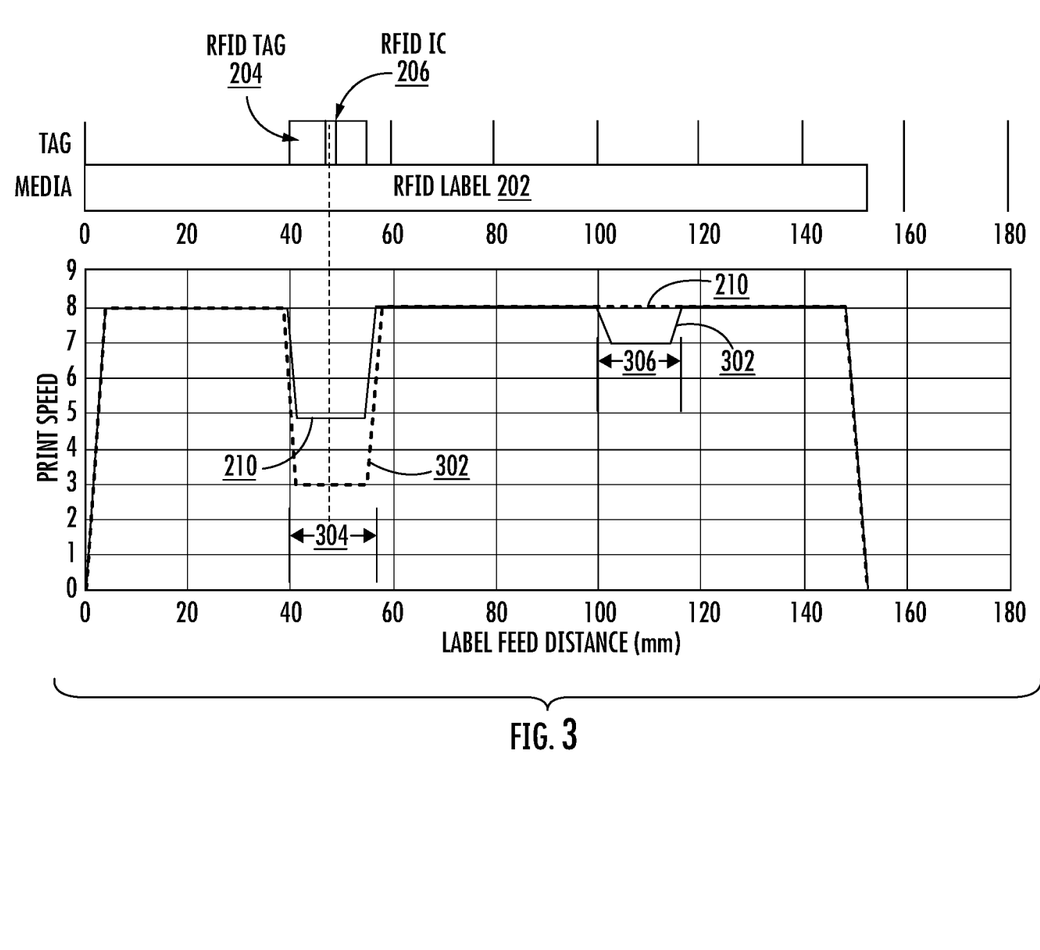
FIG. 3 illustrates a comparison of print speeds between using a single RFID antenna and using two RFID antennas for RFID encoding and verifying in accordance with some embodiments discussed herein.

FIG. 3 depicts a comparison of print speeds between using a single RFID antenna and using two RFID antennas for RFID encoding and verifying. RFID encode and verify printing 210 (from FIG. 2) of a first RFID printer that uses a single RFID antenna is compared with RFID encode and verify printing 302 of a second RFID printer that uses two RFID antennas (e.g., to separately encode and verify RFID tags). Both RFID printers (RFID encode and verify printing 210 and RFID encode and verify printing 302) may print at maximum print speed (e.g., 8 ips) during printing to a first print only zone (e.g., print only zone 104) of RFID label 202, from approximately 0 to 40 mm. As depicted in FIG. 3, print speed of both RFID encode and verify printing 210 and RFID encode and verify printing 302 is reduced during first RFID communication window 304. RFID encode and verify printing 210 performs encoding and verifying of RFID IC 206 during first RFID communication window 304, whereas RFID encode and verify printing 302 performs only encoding on RFID IC 206 during first RFID communication window 304. However, because only encoding is performed in RFID encode and verify printing 302 during first RFID communication window 304, the reduction in print speed for RFID encode and verify printing 302 is less than that of RFID encode and verify printing 210.

At the end of the first RFID communication window 304 for RFID encode and verify printing 210, the print speed of the RFID printer increases back to the maximum print speed to finish printing to a second print only zone. By contrast, in RFID encode and verify printing 302, the print speed of the RFID printer increases back to the maximum print speed at the end of the first RFID communication window 304 to continue printing the RFID label until second RFID communication window 306. During second RFID communication window 306, print speed is reduced in RFID encode and verify printing 302 in which verification of RFID IC 206 is performed. At the end of the second RFID communication window 306 for RFID encode and verify printing 302, the print speed of the RFID printer increases back to the maximum print speed to finish printing.

Despite reducing speeds at two instances per RFID label for RFID encode and verify printing 302 instead of a single instance in RFID encode and verify printing 210, overall throughput and total time taken per label of RFID encode and verify printing 302 is improved over RFID encode and verify printing 210. The additional RFID communication window may allow for encoding and decoding to be performed along different downstream locations, allowing for RFID label 202 to be printed by a RFID printer at a faster rate without heavy reduction in speed as compared to performing both encoding and decoding in a single RFID communication window. As such, the total time RFID encode and verify printing 302 may be closer to RFID encode only printing 208.

Figure 4A:
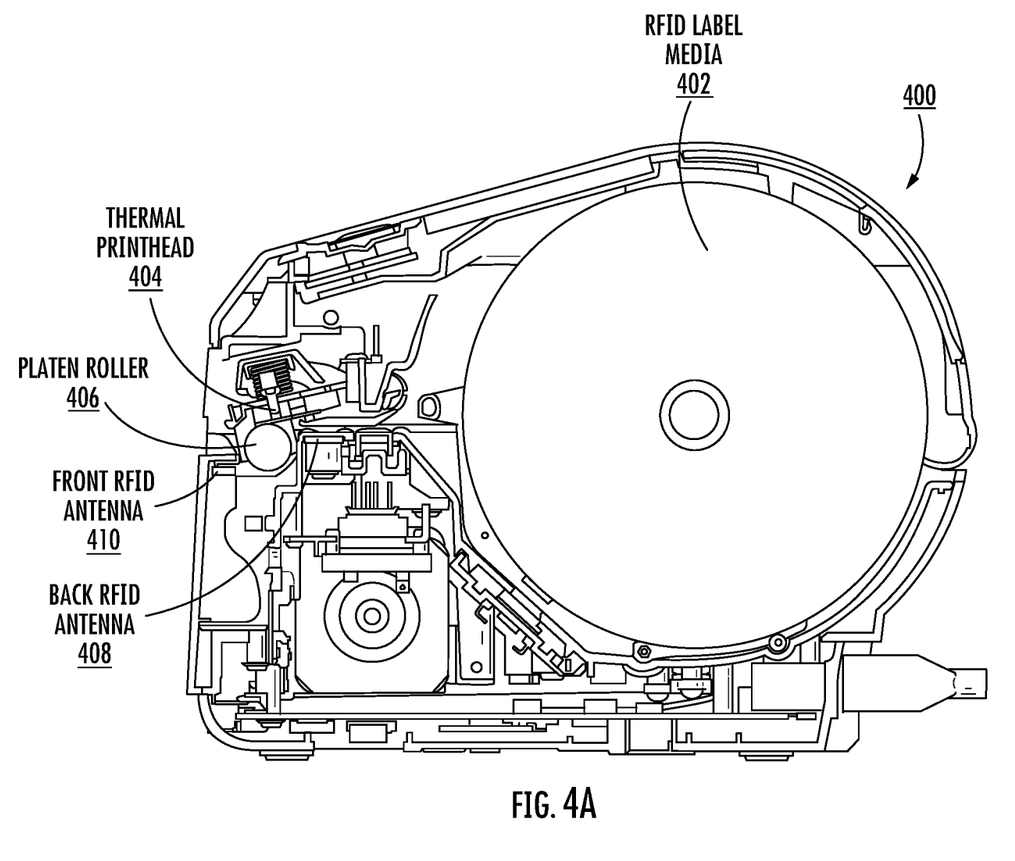
FIG. 4A and FIG. 4B illustrate an example RFID printer device in accordance with some embodiments discussed herein.
Figure 4B:
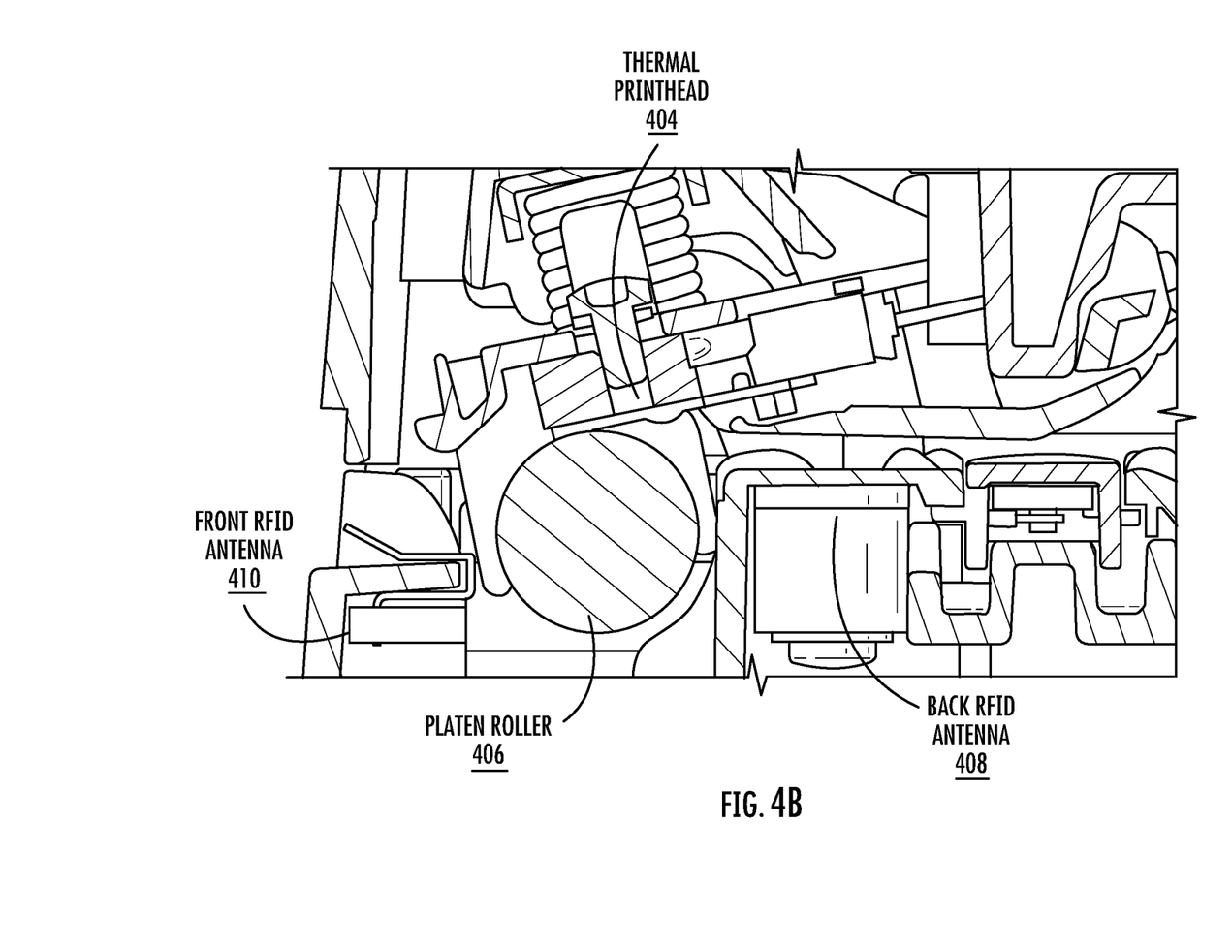

FIG. 4A and FIG. 4B depict an example RFID printer device according to some embodiments of the present disclosure. RFID printer 400 comprises RFID label media 402, thermal printhead 404, platen roller 406, back RFID antenna 408, and front RFID antenna 410. RFID label media 402 may comprise print media, such as a roll of paper and/or plastic material including sections of RFID tags embedded therewith that may be encoded while the RFID label media 402 is printed. During operation of the RFID printer 400, RFID label media 402 may be fed through between the thermal printhead 404 and the platen roller 406.

The thermal printhead 404 may comprise a plurality of resistive elements capable of being selectively energized to print data onto RFID label media 402. The resistive elements may receive energy from a power source in response to stored or programed digital information related to text, bar codes, pictorial, or graphical images. Heat from each energized element may be applied to ink media to cause transfer of ink or dye to the RFID label media 402 as the RFID label media 402 passes through between the thermal printhead 404 and the platen roller 406. Platen roller 406 may comprise a rigid shaft, usually of metal, and an elastomer layer wrapped around the shaft. The platen roller 406 may be driven by a motor that draws print media from RFID label media 402 out as the thermal printhead 404 prints on RFID label media 402.

Back RFID antenna 408 may be configured to transmit data to and receive data from one or more RFID tags associated with respective one or more RFID labels from RFID label media 402. According to various embodiments of the present disclosure, the back RFID antenna 408 may be configured to either provide RFID encode only functionality (e.g., write data only) in two antenna operation or provide RFID encode verify functionality (e.g., write and verify data) in one antenna operation. As depicted in FIG. 4A and FIG. 4B, the back RFID antenna 408 is located upstream of or before the platen roller 406 and thermal printhead 404. Back RFID antenna 408 may comprise a communication range that can be used by RFID printer 400 to establish a first RFID communication window (e.g., 304) during printing of a RFID label to perform encoding to a RFID tag associated with the RFID label. In some embodiments, the communication range of back RFID antenna 408 may determine a duration of the first RFID communication window to fit RFID encoding time (in two antenna functionality) or RFID encoding time and RFID verifying time (in one antenna functionality). As such, the duration of the first RFID communication window may determine RFID encode speed for two antenna functionality, or RFID encode speed and RFID verify speed for one antenna functionality during the first RFID communication window via the back RFID antenna 408. The communication range of back RFID antenna 408 may also be limited such that only a target RFID tag may be encoded in the first RFID communication window without inadvertent encoding to neighboring RFID tags on RFID label media 402.

Front RFID antenna 410 may be configured to transmit data to and receive data from one or more RFID tags associated with respective one or more RFID labels from RFID label media 402. In some embodiments, front RFID antenna 410 may be configured to verify data encoded to (e.g., by back RFID antenna 408) the one or more RFID tags associated with the respective one or more RFID labels in two antenna operation. Verifying the data in two antenna operation may comprise using the front RFID antenna 410 to read and, if needed, re-write data to the one or more RFID tags. In one antenna operation, since both encoding and verifying may be performed using the back RFID antenna 408, front RFID antenna 410 may not be used.

As depicted in the illustrated embodiment, the front RFID antenna 410 is located downstream of or after the platen roller 406, thermal printhead 404, and back RFID antenna 408 such that RFID verification may be performed on RFID label media 402 after passing and being encoded by the back RFID antenna 408. The front RFID antenna 410 may comprise a communication range that can be used by RFID printer 400 to establish a second RFID communication window (e.g., 306) during printing of a RFID label to perform verification of a RFID tag associated with the RFID label. In some embodiments, the communication range of front RFID antenna 410 may determine a duration of the second RFID communication window to fit RFID verifying time in two antenna functionality. As such, the duration of the second RFID communication window may determine RFID verify speed for performing RFID verifying during the second RFID communication window via the front RFID antenna 410. The communication range of front RFID antenna 410 may also be limited such that only a target RFID tag may be verified in the second RFID communication window without inadvertent verification of neighboring RFID tags on RFID label media 402.

The specific placement of back RFID antenna 408 and front RFID antenna 410 within RFID printer 400, as disclosed herewith, are merely provided as examples and are not limited to the disclosed embodiments. In some embodiments, back RFID antenna 408 and front RFID antenna 410 may also be configured a given distance relative from each other such that communications signals from each antenna do not interfere with each other. In some embodiments, the disclosed configuration of back RFID antenna 408 and front RFID antenna 410 within RFID printer 400 may allow for encoding of a RFID tag of a next RFID label while a RFID tag of a current label is being verified depending on label size/position, as both back RFID antenna 408 and front RFID antenna 410 can be activated simultaneously and independently from each other.

According to various embodiments of the present disclosure, RFID printer 400 comprises a memory device having executable instructions stored therein, and a processor, in response to the executable instructions, controls at least thermal printhead 404, platen roller 406, back RFID antenna 408, and front RFID antenna 410 to perform printing of a RFID label, encoding of data to a RFID tag associated with the RFID label, and verifying of the data encoded to the RFID tag. In some embodiments, the executable instructions and the processor may comprise printer firmware executed by a programmable processor. The programmable processor may be implemented as, for example, various devices comprising one or a plurality of microprocessors with accompanying digital signal processors; one or a plurality of processors without accompanying digital signal processors; one or a plurality of coprocessors; one or a plurality of multi-core processors; one or a plurality of controllers; processing circuits; one or a plurality of computers; and various other processing elements (including integrated circuits, such as ASICs or FPGAs, or a certain combination thereof). In some embodiments, the programmable processor may comprise one or more processors.

In some embodiments, the printer firmware may cause the programmable processor to determine whether to use a single RFID antenna or two RFID antennas for RFID encoding and verifying based on one or more factors. That is, for certain operation conditions, printing speed may not be impacted by performance of RFID encoding and verifying, and as such, encoding and verifying of one or more RFID tags on one or more RFID labels may be performed using a single RFID antenna. The determination to use a single RFID antenna or two RFID antennas may be determined based on one or more operating parameters, such as RFID encoding time, RFID reading time, maximum print speed, RFID communication window size, RFID communication window margin, or ramp up/down.

RFID encoding time may comprise an amount of time required to encode to a RFID tag. The more data there is to encode to a RFID tag, the longer the RFID encoding time. Accordingly, an increase in encoding time may correspond to a decrease in printing speed needed to allow for more time to perform RFID encoding (e.g., RFID encode speed). Furthermore, printing speed needed to allow for RFID verifying (e.g., RFID verify speed) may depend on RFID verifying time, which may be a sum of RFID reading time and RFID encoding time (in the event that re-writing data to a RFID tag is necessary). RFID reading time may comprise an amount of time required to read data from a RFID tag. The more data there is to read from a RFID tag, the longer the RFID reading time. Accordingly, an increase in reading time may correspond to a decrease in printing speed needed to allow for reading data (e.g., RFID read speed). Increases in either RFID encoding time or RFID reading time may correspond to a decrease in RFID verify speed.

Maximum print speed may comprise a highest operating print speed of a RFID printer. The faster the maximum print speed, the more likely of a need to decrease it during RFID encoding and verifying operations. A reduction of the print speed from the maximum print speed allows for more time to encode/verify a RFID tag.

A RFID communication window size may comprise a size of a RFID communication window. A wider RFID communication window may allow more time to encode/verify a RFID tag and obviate a need to reduce print speed. Whereas a small RFID communication window size may require a reduction in print speed to allow for sufficient time to encode/verify a RFID tag.

A RFID communication window margin may comprise a length of media (e.g., RFID label media 402) or distance before/after a RFID communication window that is required for a given RFID read/write speed. The RFID communication window margin is used to ensure a correct speed before performing encoding/verifying.

Ramp up/down may comprise a length of media or distance required to ramp up or down between stopped and maximum print speed.

According to various embodiments of the present disclosure, printer firmware may cause a programmable processor of a RFID printer to perform an initialization procedure to configure operation of at least thermal printhead 404, platen roller 406, back RFID antenna 408, and front RFID antenna 410 to perform printing, RFID encoding, and RFID verifying based on one or more operating parameters. The initialization procedure may comprise determining and comparing RFID encoding time and RFID verifying time with maximum print speed. Depending on the size of the data (to be encoded) and the maximum print speed, the processor can choose to use (i) two RFID antennas for RFID encoding and RFID verifying based on if print speed reductions can be lessened if two RFID antennas were used to separately perform the encoding and verifying, or (ii) a single RFID antenna to perform both RFID encoding and RFID verifying if there would be no lessening of print speed reductions or no improvement in print speed if two RFID antennas were used to separately perform the encoding and verifying. For example, a combination of one or more of maximum print speed, RFID encode speed, RFID reading speed, or RFID communication window size may be determined to compare an amount of print speed reductions from RFID encoding and verifying operations using only one antenna with an amount of print speed reductions from RFID encoding and verifying operations using two RFID antennas. In some embodiments, a combination of lower maximum print speed, higher RFID encode speed, higher RFID reading speed, or larger RFID communication window size may lessen print speed reductions and obviate a need to use two RFID antennas.

Figure 5A:
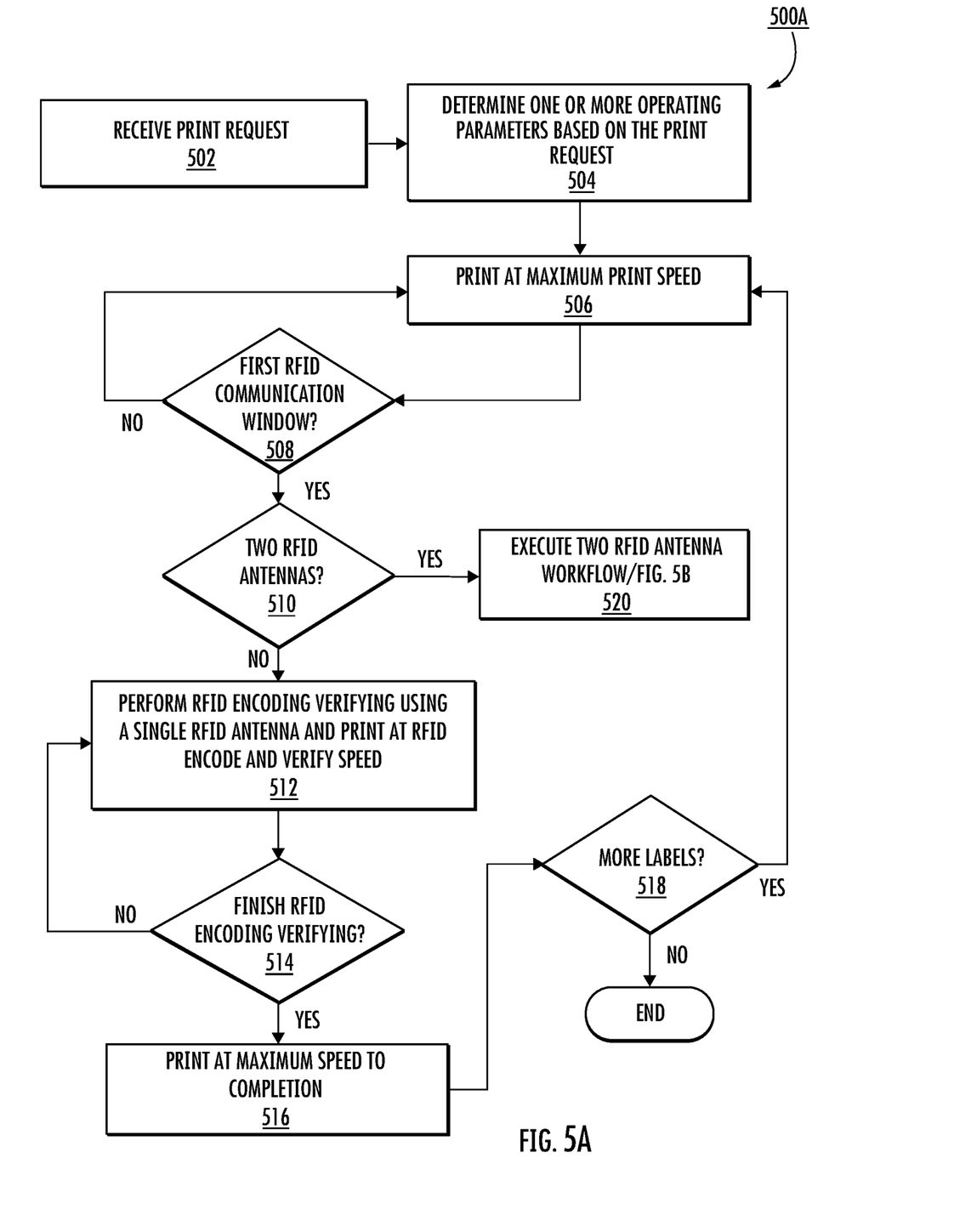
FIG. 5A and FIG. 5B illustrate flowcharts of example methods for managing RFID printer operations in accordance with some embodiments discussed herein.
Figure 5B:
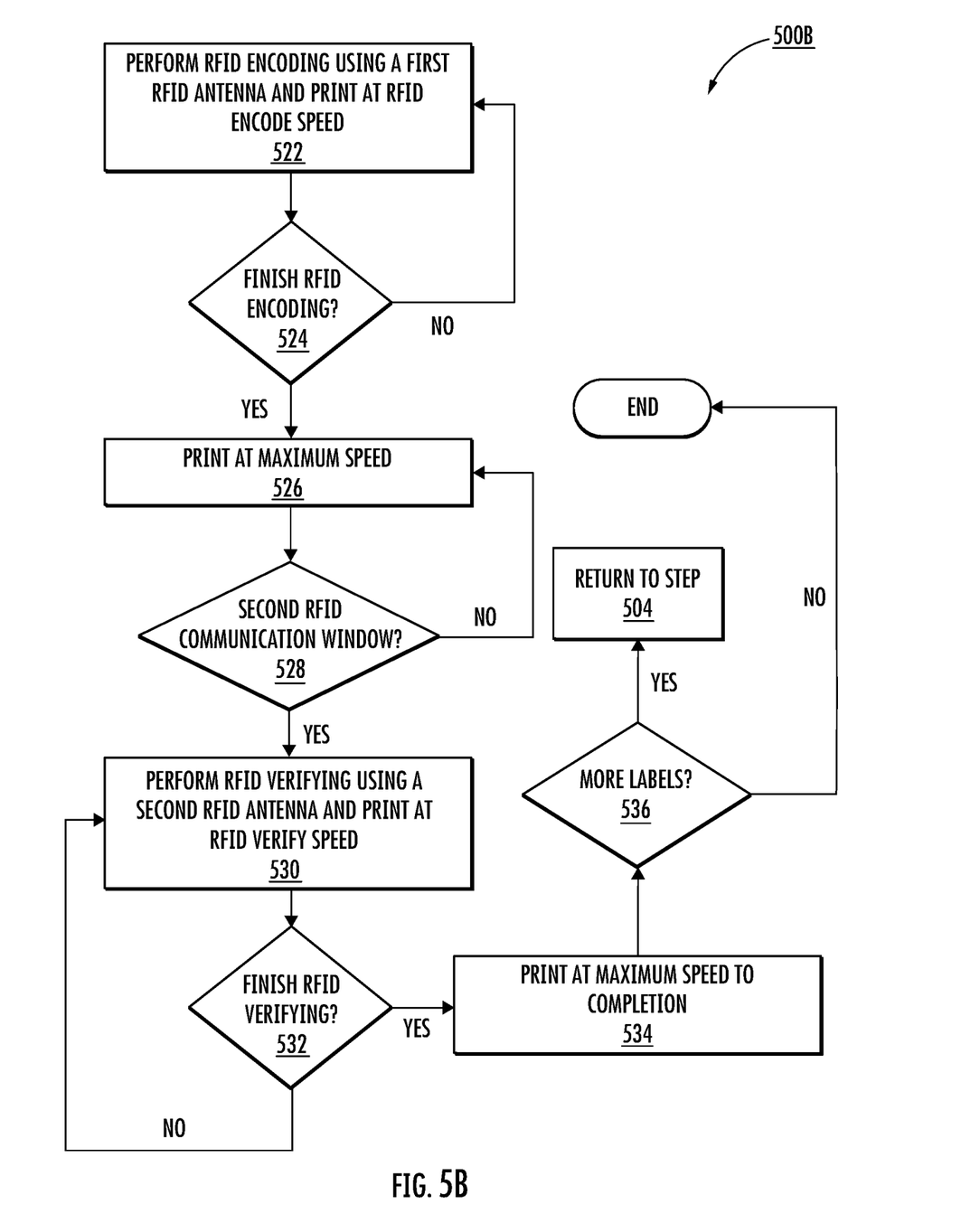

Referring now to FIG. 5A and FIG. 5B, example flow diagrams illustrating example methods for managing RFID printer operations in accordance with some example embodiments of the present disclosure are provided. It is noted that each block of the flowcharts, and combinations of blocks in the flowcharts, may be implemented by various means such as hardware, firmware, circuitry and/or other devices associated with execution of software including one or more computer program instructions. For example, one or more of the steps/operations described in FIG. 5A and FIG. 5B may be embodied by computer program instructions, which may be stored by a non-transitory memory of an apparatus employing an embodiment of the present disclosure and executed by a processor component in an apparatus. For example, these computer program instructions may direct the processor component to function in a particular manner, such that the instructions stored in the computer-readable storage memory produce an article of manufacture, the execution of which implements the function specified in the flowchart block(s).

As described above and as will be appreciated based on this disclosure, embodiments of the present disclosure may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Similarly, embodiments may take the form of a computer program code stored on at least one non-transitory computer-readable storage medium. Any suitable computer-readable storage medium may be utilized including non-transitory hard disks, CD-ROMs, flash memory, optical storage devices, or magnetic storage devices.

Referring now to FIG. 5A, an example method 500A of managing RFID printer operations in accordance with some example embodiments described herein is illustrated. At step 502, a programmable processor (e.g., of a RFID printer) receives a print request. The print request may comprise instructions to print one or more RFID labels with RFID encoding verifying. RFID encoding verifying may comprise writing data to one or more RFID tags associated with respective one or more RFID labels and verifying the data written to the one or more RFID tags by reading data from the one or more RFID labels, and if the data read from a RFID label is not the same as the written data, re-writing data to the RFID label. Data written to a RFID tag may comprise a unique identifier and descriptive information, such as characteristics of an item that may be attached with the RFID tag.

In some embodiments, subsequent to step 502, the example method proceeds to step 504, where the programmable processor determines one or more operating parameters based on the print request. The one or more operating parameters may be used to control various components of a RFID printer to fulfill the print request. In some embodiments, the one or more operating parameters comprise at least one of: RFID encoding time, RFID reading time, maximum print speed, RFID communication window size, RFID communication window margin, or ramp up/down.

In some embodiments, subsequent to step 504, the example method proceeds to step 506, where the programmable processor instructs the RFID printer to print at maximum print speed. For example, the RFID printer may print at maximum print speed during printing to a print only zone of a RFID label.

In some embodiments, subsequent to step 506, the example method proceeds to step 508, where the programmable processor determines whether a first RFID communication window has started. The RFID printer may be allowed to continue printing the RFID label at maximum print speed until the first RFID communication window starts. The first RFID communication window may comprise a period of time when a RFID antenna is able to access or establish communication with a RFID IC associated with a RFID tag being printed.

In some embodiments, subsequent to step 508, if the first RFID communication window has started, the example method proceeds to step 510, where the programmable processor determines whether two RFID antennas are used to perform RFID encoding verifying. The determination of whether two RFID antennas are used to perform RFID encoding verifying may be based on the one or more operating parameters. Two RFID antennas may be used if the processor determines an improvement in printing speed reductions (e.g., less reductions) by separating the performance of RFID encoding verifying into two RFID communication windows (e.g., RFID encoding performed in a first RFID communication window and RFID verifying performed in a second RFID communication window). However, the processor may determine to use a single RFID antenna if there would be no decrease in print speed reductions or no improvement in print speed if two RFID antennas were used to perform RFID encoding verifying in separate RFID communication windows.

In some embodiments, subsequent to step 510, if two RFID antennas are not used, the example method proceeds to step 512, where the programmable processor instructs the RFID printer to perform RFID encoding verifying using a single RFID antenna and to print at a RFID encode and verify speed. During the first RFID communication window, the print speed of the RFID printer may be decreased from the maximum print speed to the RFID encode and verify speed during which both RFID encoding and verifying is performed on the RFID tag using a RFID single antenna (e.g., back RFID antenna 408). The programmable processor may transmit and receive data via the single antenna to perform the RFID encoding verifying during the first RFID communication window. The first RFID communication window may comprise a duration of time sufficient for performing RFID encoding verifying with respect to the RFID tag at the RFID encode and verify speed. RFID encode and verify speed may be based on a sum of RFID encoding time and RFID verifying time. RFID verifying time may comprise both RFID reading time (to read data from a RFID tag) and RFID encoding time (if re-writing data to a RFID tag is needed).

In some embodiments, subsequent to step 510, if two RFID antennas are used, the example method proceeds to step 520, where the programmable processor instructs the RFID printer to execute two RFID antenna workflow, which is described in further detail with respect to the description of FIG. 5B.

In some embodiments, subsequent to step 512, the example method proceeds to step 514, where the programmable processor determines whether the RFID encoding verifying has finished. The RFID printer may continue performing RFID encoding verifying and printing at the RFID encode and verify speed until RFID encoding verifying has finished. Finishing RFID encoding verifying may also coincide with an end to the first RFID communication window.

In some embodiments, subsequent to step 514, if the RFID encoding verifying has finished, the example method proceeds to step 516, where the programmable processor instructs the RFID printer to resume printing the RFID label at maximum speed to completion.

In some embodiments, subsequent to step 516, the example method proceeds to step 518, where the programmable processor determines whether there are additional RFID labels in the print request. If there are additional RFID labels in the print request, the example method returns to step 506, where the programmable processor instructs the RFID printer to continue printing a next RFID label. Otherwise, if there are no additional RFID labels in the print request, the RFID may conclude operations associated with the print request.

Referring now to FIG. 5B, an example method 500B of executing a two-antenna workflow in accordance with some example embodiments described herein is illustrated. In some embodiments, subsequent to step 510 from example method 500A, at step 522, the programmable processor instructs the RFID printer to perform RFID encoding using a first RFID antenna and to print at a RFID encode speed during the first communication window. In example method 500B, the first RFID communication window may comprise a period of time when a first RFID antenna (e.g., back RFID antenna 408) is able to access or establish communication with a RFID IC associated with a RFID tag being printed. During the first RFID communication window, the print speed of the RFID printer may be decreased from the maximum print speed to the RFID encode speed during which RFID encoding is performed on the RFID tag using the first RFID antenna. The programmable processor may transmit data via the first RFID antenna to perform the RFID encoding during the first RFID communication window. According to method 500B, the first RFID communication window may comprise a duration of time sufficient for performing RFID encoding to a RFID tag at the RFID encode speed. The RFID encode speed may be based on a RFID encoding time.

In some embodiments, subsequent to step 522, the example method proceeds to step 524, where the programmable processor determines whether the RFID encoding has finished. The RFID printer may continue performing RFID encoding and printing at the RFID encode speed until RFID encoding has finished. Finishing RFID encoding may also coincide with an end to the first RFID communication window.

In some embodiments, subsequent to step 524, if the RFID encoding has finished, the example method proceeds to step 526, where the programmable processor instructs the RFID printer to resume printing at maximum speed.

In some embodiments, subsequent to step 526, the example method proceeds to step 528, where the programmable processor determines whether a second RFID communication window has started. The RFID printer may be allowed to continue printing the RFID label at maximum print speed until the second RFID communication window starts. The second RFID communication window may comprise a period of time when a second RFID antenna (e.g., front RFID antenna 410) is able to access or establish communication with a RFID IC associated with a RFID tag being printed.

In some embodiments, subsequent to step 528, the example method proceeds to step 530, where the programmable processor instructs the RFID printer to perform RFID verifying using a second RFID antenna and to print at a RFID verify speed. During the second RFID communication window, the print speed of the RFID printer may be decreased from the maximum print speed to the RFID verify speed during which RFID verifying is performed on the RFID tag using the second RFID antenna. The programmable processor may receive and transmit (if needed, e.g., for re-writing) data via the second RFID antenna to perform the RFID verifying during the second RFID communication window. The second RFID communication window may comprise a duration of time sufficient for performing RFID verifying of the RFID tag at the RFID verify speed. The RFID verify speed may be based on a RFID verifying time. RFID verifying time may comprise both RFID reading time (to read data from a RFID tag) and RFID encoding time (if re-writing data to a RFID tag is needed).

In some embodiments, subsequent to step 530, the example method proceeds to step 532, where the programmable processor determines whether the RFID verifying has finished. The RFID printer may continue performing RFID verifying and printing at the RFID verify speed until RFID verifying has finished. Finishing RFID verifying may also coincide with an end to the second RFID communication window.

In some embodiments, subsequent to step 532, if the RFID verifying has finished, the example method proceeds to step 534, where the programmable processor instructs the RFID printer to resume printing the RFID label at maximum speed to completion.

In some embodiments, subsequent to step 534, if the RFID verifying has finished, the example method proceeds to step 536, where the programmable processor determines whether there are additional RFID labels in the print request. If there are additional RFID labels in the print request, the example method returns to step 504 of method 500A, where the programmable processor instructs the RFID printer to continue printing a next RFID label. Otherwise, if there are no additional RFID labels in the print request, the RFID may conclude operations associated with the print request.

It is to be understood that the disclosure is not to be limited to the specific embodiments disclosed, and that modifications and other embodiments are intended to be included within the scope of the appended claims. Although specific terms are employed herein, they are used in a generic and descriptive sense only and not for purposes of limitation, unless described otherwise.

The invention claimed is:

1. A radio frequency identification (RFID) printer device for encoding and verifying RFID labels, the RFID printer device comprising:
a thermal printhead;
a platen roller;
a first RFID antenna configured upstream from the thermal printhead and the platen roller;
a second RFID antenna configured downstream from the first RFID antenna;
a memory device having executable instructions stored therein; and
one or more processors communicatively coupled to the memory device, wherein when the executable instructions are executed by the one or more processors, cause the one or more processors to:
determine a maximum print speed of the RFID printer device and a size of data to be encoded in a RFID label;
determine an amount of print speed reduction during RFID encoding and verifying operations (i) when the first RFID antenna is used for the RFID encoding and verifying operations and (ii) when the first RFID antenna and the second RFID antenna are used for the RFID encoding and verifying operations, respectively, based on at least the maximum print speed of the RFID printer device and the size of the data to be encoded in the RFID label; and
select between (i) a first mode of operation comprising the first RFID antenna and (ii) a second mode of operation comprising the first RFID antenna and the second RFID antenna, such that the amount of print speed reductions is minimized in performing the RFID encoding and verifying operations.

2. The RFID printer device of claim 1, wherein, when the first RFID antenna and the second RFID antenna are selected for the RFID encoding and verifying operations, respectively, and the one or more processors are further configured to:
encode, via the first RFID antenna, the data to one or more RFID tags associated with respective one or more RFID labels during a first RFID communication window, wherein the first RFID antenna is configured with RFID encode only functionality during the first RFID communication window; and
verify, via the second RFID antenna, encoding of the data during a second RFID communication window.

3. The RFID printer device of claim 2, wherein the first RFID antenna comprises a first communication range used to establish the first RFID communication window.

4. The RFID printer device of claim 3, wherein a duration of the first RFID communication window is based on the first communication range.

5. The RFID printer device of claim 4, wherein a RFID encode speed associated with encoding of the data using the first RFID antenna is based on the duration of the first RFID communication window.

6. The RFID printer device of claim 2, wherein the second RFID antenna comprises a second communication range used to establish the second RFID communication window.

7. The RFID printer device of claim 6, wherein a duration of the second RFID communication window is based on the second communication range.

8. The RFID printer device of claim 7, wherein a RFID verify speed associated with verifying encoding of the data using the second RFID antenna is based on the duration of the second RFID communication window.

9. The RFID printer device of claim 2, wherein the one or more processors are further configured to determine to use the first RFID antenna and the second RFID antenna based on a lessening of the print speed reductions by separately encoding the data and verifying encoding of the data.

10. The RFID printer device of claim 2, wherein the one or more processors are further configured to determine to use the first RFID antenna and the second RFID antenna based on one or more operating parameters, wherein the one or more operating parameters comprises at least one of: RFID encoding time, RFID reading time, size of the first RFID communication window, or size of the second RFID communication window.

11. The RFID printer device of claim 10, wherein, when the first RFID antenna is selected for the RFID encoding and verifying operations, the one or more processors are further configured to perform encoding and verifying of one or more RFID tags on one or more RFID labels using the first RFID antenna.

12. A method for encoding and verifying a radio frequency identification (RFID) label, the method comprising:
receiving, by one or more processors of a RFID printer, a print request;
determining, by the one or more processors, in response to receiving the print request, a maximum print speed and a size of data to be encoded in a RFID label;
determining, by the one or more processors, an amount of print speed reductions during RFID encoding and verifying operations (i) when a first RFID antenna is used for the RFID encoding and verifying operations and (ii) when the first RFID antenna and a second RFID antenna are used for the RFID encoding and verifying operations, respectively, based on at least the maximum print speed and the size of data to be encoded; and
selecting, by the one or more processors, between (i) a first mode of operation comprising the first RFID antenna and (ii) a second mode of operation comprising the first RFID antenna and the second RFID antenna, such that the amount of print speed reductions is minimized in performing the RFID encoding and verifying operations.

13. The method of claim 12, further comprising:
when the first RFID antenna and the second RFID antenna are selected for the RFID encoding and verifying operations, respectively, the method further comprises:
instructing, by the one or more processors, the RFID printer to encode, using the first RFID antenna, the data to one or more RFID tags associated with respective one or more RFID labels during a first RFID communication window; and
instructing, by the one or more processors, the RFID printer to verify, using the second RFID antenna, encoding of the data during a second RFID communication window.

14. The method of claim 13, further comprising:
instructing, by the one or more processors, the RFID printer to print at the maximum print speed prior to the first RFID communication window; and
instructing, by the one or more processors, the RFID printer to print at the maximum print speed after finishing encoding of the data and prior to the second RFID communication window.

15. The method of claim 13, further comprising:
instructing, by the one or more processors, the RFID printer to print at the maximum print speed until completion of printing of one or more RFID labels after finishing the verifying of the encoding of the data.

16. The method of claim 13, further comprising:
decreasing a print speed of the RFID printer from the maximum print speed to a RFID encode speed during the first RFID communication window.

17. The method of claim 16, further comprising:
encoding the data to the one or more RFID tags associated with the respective one or more RFID labels at the RFID encode speed during the first RFID communication window.

18. The method of claim 13, further comprising:
decreasing a print speed of the RFID printer from the maximum print speed to a RFID verify speed during the second RFID communication window.

19. The method of claim 18, further comprising:
verifying the encoding of the data at the RFID verify speed during the second RFID communication window.

20. One or more non-transitory computer-readable storage media including instructions that, when executed by one or more processors, cause the one or more processors to:
receive a print request;
determine one or more operating parameters based on the print request;
determine in response to the print request, a maximum print speed and a size of data to be encoded in a radio frequency identification (RFID) label;
determine an amount of print speed reductions during RFID encoding and verifying operations (i) when a first RFID antenna is used for the RFID encoding and verifying operations and (ii) when the first RFID antenna and a second RFID antenna is used for the RFID encoding and verifying operations, respectively, based on at least the maximum print speed and the size of data to be encoded; and
select between (i) a first mode of operation comprising the first RFID antenna and (ii) a second mode of operation comprising the first RFID antenna and the second RFID antenna, such that the amount of print speed reductions is minimized in performing the RFID encoding and verifying operations.

* * * * *